United States Patent [19]

Mierzwinski

[11] 3,814,852

[45] June 4, 1974

[54] AMBIENT LIGHT RESPONSIVE CONTROL OF BRIGHTNESS, CONTRAST AND COLOR SATURATION

[75] Inventor: Eugene P. Mierzwinski, Fort Wayne, Ind.

[73] Assignee: The Magnavox Company, Ft. Wayne, Ind.

[22] Filed: Nov. 27, 1972

[21] Appl. No.: 309,872

[52] U.S. Cl. ...................... 178/7.5 DC, 178/5.4 AC

[51] Int. Cl. .......................... H04n 5/16, H04n 5/68

[58] Field of Search ........ 178/5.4 R, 5.4 AC, 7.5 R, 178/7.5 DC

[56] References Cited

UNITED STATES PATENTS

| | | | |
|---|---|---|---|
| 3,214,517 | 10/1965 | Vogt et al. | 178/7.5 DC |
| 3,622,696 | 11/1971 | Macintyre, Jr. | 178/7.5 DC |

OTHER PUBLICATIONS

Electronics World pp. 27, 98, November 1966.

*Primary Examiner*—Robert L. Richardson

*Attorney, Agent, or Firm*—T. A. Briody; W. W. Holloway; R. T. Seeger

[57] ABSTRACT

A circuit deployed in a color televison receiver for varying the brightness, contrast and color saturation of a displayed picture in accordance with variations in ambient light in the vicinity of a receiver screen is disclosed comprising a light sensing means mounted near the receiver screen and having an electrical parameter which varies in accordance with variations in the light incident on the light sensing means and means responsive to those variations in the electrical parameter for varying the gains imparted to both the luminance and chrominance signals. In the disclosed preferred embodiment the light sensing means is a light dependent resistor such as a simple cadmium sulphide cell the resistance of which varies in response to changes in the light impinging thereon. These variations in resistance are used to control the gain of both the chrominance and the luminance amplifiers of the receiver and in one preferred embodiment these resistance variations were transferred by way of a light emitting diode and second light dependent resistor to the luminance amplifier stage in order to isolate the luminance amplifier from the original light dependent resistor.

3 Claims, 3 Drawing Figures

AMBIENT LIGHT RESPONSIVE CONTROL OF BRIGHTNESS, CONTRAST AND COLOR SATURATION

BACKGROUND OF THE INVENTION

The present invention relates generally to a televison receiver control system and more particularly to a control system for maintaining proper balance between room lighting conditions and the level of picture tube excitation. More especially the present invention functions to increase contrast and intensity and in the case of a color televison receiver also color saturation when the room lighting level increases and to diminish these parameters when the level of room lighting decreases.

Conventional televison receivers of course, have manually operable controls by means of which a viewer may set the level of contrast, intensity, and color saturation to what he feels to be an optimum level for given room lighting conditions. Under changed room lighting conditions the viewer will obtain the optimum viewing situation by changing these manual controls to a new preferred level.

It is also known in the prior art to automate this process for a black and white televison receiver for example, as taught in U.S. Pat. No. 3,165,582 to Korda, issued Jan. 12, 1965, and French Pat. No. 1,223,058 issued in June of 1960. Both of these prior art approaches employ a light sensitive element to vary both the contrast and brightness of a black and white picture however, in both of these prior art approaches the system for varying the brightness is distinct from the system for varying the contrast, although both employ the same light sensitive element. Thus, for example in the French patent the voltage that determines the background brightness is taken from a junction between two load resistors and fed to one of the cathode ray tube control grids while the voltage that determines the contrast is taken from one of the leads of a photosensitive resistor and fed to a screen grid of the video amplifier tube. In the Korda patent, brightness control is achieved by varying a cathode ray tube voltage whereas contrast control is again achieved by varying the screen voltage on the video amplifier tube. Thus it is clear that these prior art systems use different control approaches for contrast and brightness.

It is accordingly one object of the present invention to provide an improved automatic contrast and brilliance control for a black and white televison receiver.

Another object of the present invention is to accomplish the foregoing object employing but a single control function.

By employing but a single control function to achieve brilliance and contrast control the light sensing means may more easily be relied on for color saturation control in a color televison receiver.

It is accordingly a further object of the present invention to provide an automatic color saturation control for a color televison receiver.

Making direct electrical connection between a light sensing means such as a light dependent resistor located toward the front of a televison receiver near the screen so as to be responsive to the same general ambient lighting conditions as experienced by the receiver screen and the video amplifier which is generally located some distance therefrom creates problems of long leads and attendant uncontrolled stray capacitance. Further certain light sources such as fluorescent lamps provide light modulated at 120 cycles per second and if the light sensing means is coupled directly to the video amplifier this modulation may be reproduced in the picture as so-called hum-bars.

It is accordingly a still further object of the present invention to provide a system for isolating a light sensing control element from the video circuitry in a televison receiver.

Yet another object of the present invention is to provide a circuit for varying the contrast, brightness, and color saturation of a displayed picture in accordance with variations in ambient light conditions.

SUMMARY OF THE INVENTION

The foregoing as well as numerous other objects and advantages of the present invention are achieved by providing a light sensitive element in a televison receiver exposed to ambient light in the vicinity of the receiver for controlling brightness, contrast and color saturation of the displayed picture in accordance with the level of ambient light. The circuit of the present invention in response to an increase of ambient light level functions to increase the gain of the luminance amplifier and to increase the gain of the chrominance band pass amplifier whereas when the ambient light level decreases the respective gains of these two amplifiers are decreased. The circuit is effective to control both brightness and contrast by appropriately proportioning the AC to DC gain ratio of the video or luminance amplifier so as to maintain the appropriate black level in the picture at all times. The circuit of the present invention also employs an encapsulated light emitting diode or other light source such as an incandescent lamp and a light dependent resistor to electrically isolate the light sensing element from the video amplifier of the receiver.

BRIEF DESCRIPTION OF THE DRAWING

The aforementioned and other objects, features and advantages of the present invention will become more apparent from the following detailed description thereof when considered in conjunction with the drawings wherein.

DESCRIPTION OF THE PREFERRED EMBODIMENT

Figure 1:
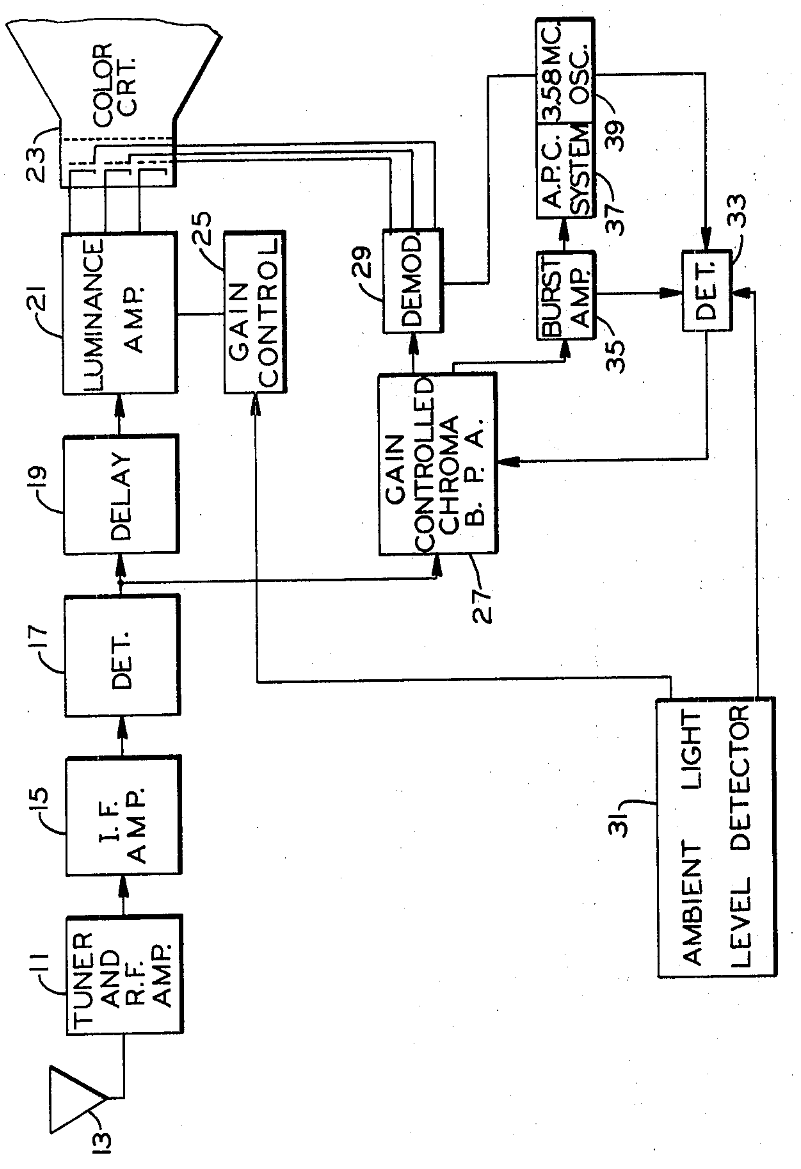
FIG. 1 is a partial block diagram of a color televison receiver employing the present invention.

Considering first FIG. 1 which illustrates generally in block diagram form a color televison receiver embodying the present invention, this receiver is seen to comprise a tuner and radio frequency amplifier 11 for detecting and amplifying incoming signals received on the antenna 13 and supplying those signals through an appropriate heterodyning process to an intermediate frequency amplifier 15. After detection in the detector 17, the luminance signals are passed through a delay 19 which compensates for the delays experienced by the chrominance signals and then to the luminance amplifier 21, which of course corresponds to the video amplifier of a black and white receiver, to then be supplied to the cathode ray tube 23. The luminance or video amplifier may also be provided with gain control circuitry 25. An appropriate band pass amplifier 27 may be employed to separate out the chrominance signals which are demodulated by the demodulator 29 in well known fashion to provide the three color difference signals to grids in the color cathode ray tube 23. While the present invention will be described with respect to such color difference signals, it is equally applicable to direct RGB color separation systems. An ambient light level detector 31 such as a light dependent resistor of the cadmium sulphide variety is physically located on the front of the televison receiver in such a position as to be exposed to the light levels in the vicinity of the receiver so that its resistance varies inversely in accordance with variations in the ambient light levels around the receiver. These resistance variations are then employed to control the gain of the luminance amplifier 21 by way of gain control 25 and to control the gain of the chrominance amplifier circuitry.

The entire color demodulation process is only generally depicted in the block diagram of FIG. 1 and is illustrated as a closed loop burst gain controlled chroma amplifier system with auxiliary chroma gain control introduced by way of the detector 33 from the ambient light level detector 31. A burst gain controlled chroma amplifier circuit is somewhat analogous to a black and white keyed AGC circuit and functions to set the gain level of the amplifier 27 in accordance with the color sync burst rather than the chroma signal level associated with a particular picture. While the present invention is being described with respect to this preferred type of gain control it would of course be possible, in televison circuits employing DC gain controls for chroma and/or contrast, to connect the ambient light tracking means to these direct current control circuits. The gain controlled chroma band pass amplifier of course supplies an output to a burst amplifier 35 which in turn drives an automatic phase control system 37 for synchronizing the 3.58 megacycle oscillator 39 the output of which is used in the color demodulation process.

Figure 2:
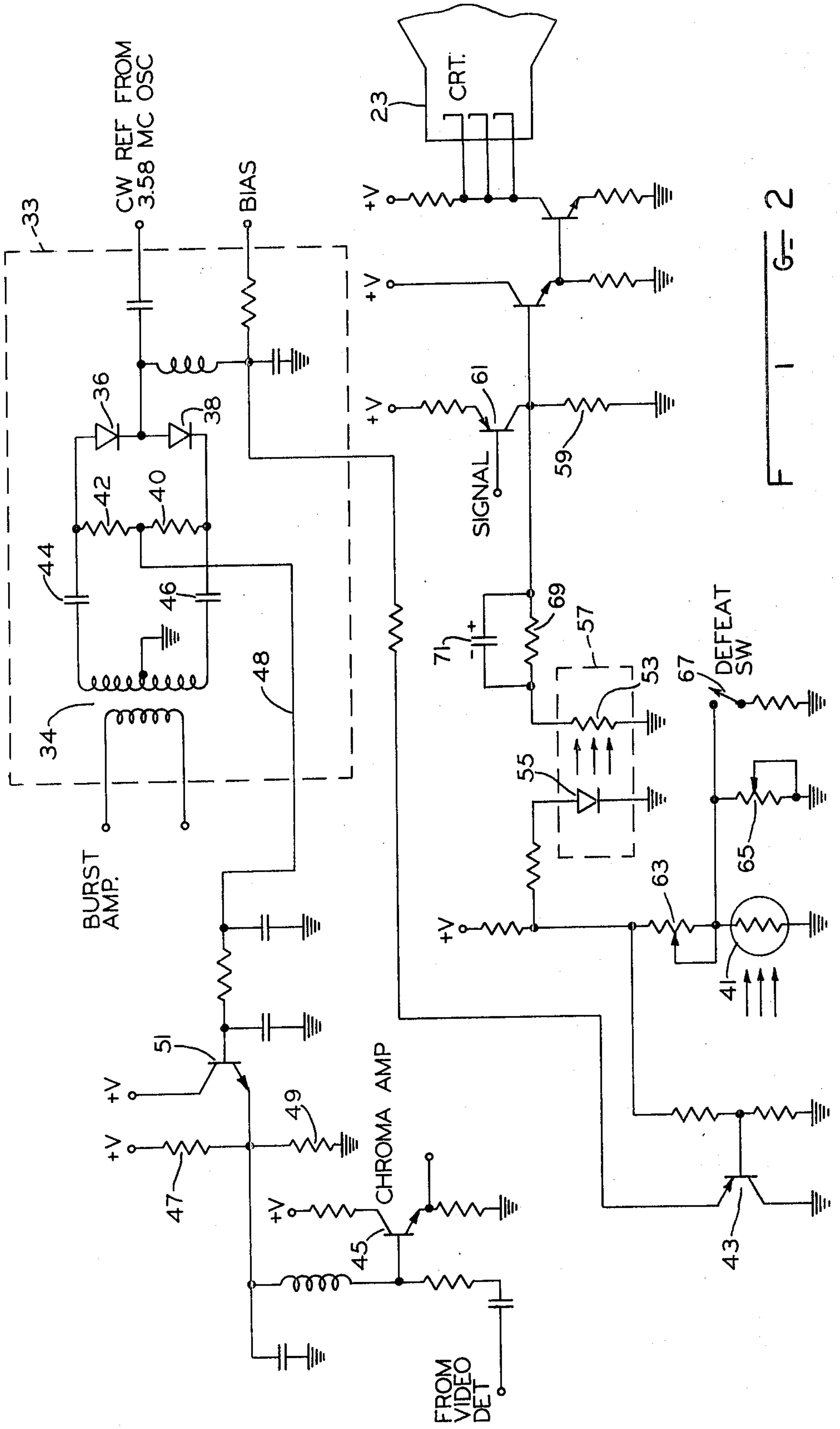
FIG. 2 is a detailed schematic diagram of those portions of FIG. 1 embodying the present invention.

Considering now FIG. 2 which illustrates schematically in detail those portions of the receiver of FIG. 1 necessary for a complete understanding of the present invention, the light dependent resistor 41 is mounted near the front of the televison receiver in such a position as to adequately receive the ambient lighting conditions in the vicinity of the receiver. The resistance of this device is inversely proportional to the intensity of light incident thereon. If the room ambient light experiences an increase in level the resistance of light dependent resistor 41 will decrease which decrease in turn lowers the voltage at the base of transistor 43 which in turn lowers the voltage at the emitter due to increased conduction through that transistor. This in turn increases the gain of the chroma amplifier transistor stage 45. More presisely the lowering of the voltage at the emitter of transistor 43 raises a threshold in the automatic chroma control detector 33 so that the color saturation level to the picture tube is increased. In the absense of a chroma signal with its synchronizing burst the gain of the chroma amplifier is set at a maximum by the voltage divider comprising resistors 47 and 49. At this time there is no output from the automatic chroma control detector to the base of transistor 51 and that transistor is non-conducting.

Figure 3:
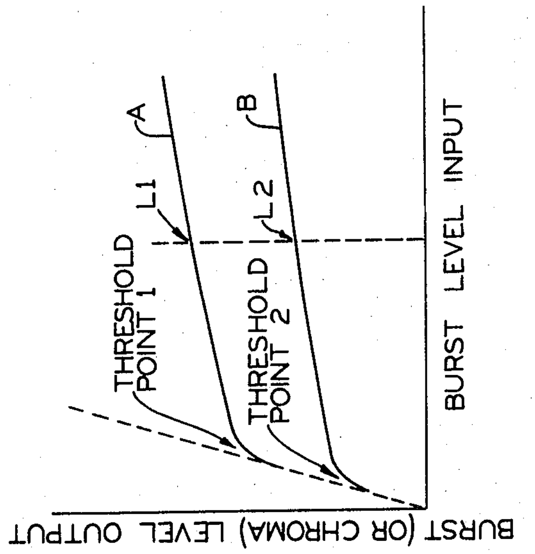
FIG. 3 illustrates chroma gain control characteristic curves for the circuit of FIG. 2.

When a color signal is received, the detector provides an output signal proportional to the color sync burst level which turns on the transistor 51 to control the gain of the chroma amplifier stage 45 so as to maintain the desired output level. The turn on level of transistor 51 represents a fairly well defined knee in the chroma gain control characteristic curves illustrated in FIG. 3. Operation beyond the knee or threshold of such a curve operates to maintain a nearly constant chroma output level while operation below the knee of the curve and its extension as the almost vertical dotted line represents the open loop characteristic wherein there is no automatic gain control to the chroma amplifier. Since transistor 51 is non-conducting below the knee of this curve, gain control is delayed until the output signal reaches this threshold point. Since variations in the potential at the emitter of transistor 43 cause corresponding variations in the potential at the base of transistor 51, it is clear that a variation in the resistance of the light dependent resistor 41 will for example cause the gain control characteristic curve to shift from that depicted by curve A to that depicted by curve B and that for a given burst level input as represented by the vertical dotted line, two different levels of chroma output which in turn cause two different levels of color saturation will be achieved by a change in the light intensity incident on the resistor 41.

To better understand the operation of detector 33, assume that the burst voltage induced across the top half of the secondary of transformer 34 is in phase with the 3.58 megacycle reference signal and that the burst voltage induced across the bottom half of the secondary of transformer 34 is 180° out of phase with this reference signal. Assuming further that the diodes 36 and 38 have equal characteristics, that the resistors 40 and 42 are equal, that the capacitors 44 and 46 are equal, and that the two portions of the secondary winding on transformer 34 are equal when no burst is being received diodes 36 and 38 will conduct equally but during opposite portions of a cycle. Diode 36 conducts during negative excursions of the reference signal whereas diode 38 conducts during positive portions of that reference wave form. Thus during the negative portions of the reference wave form diode 36 conducts to charge capacitor 44 so that its right hand plate is negative and its left hand plate is positive. During the positive excursions, diode 38 conducts to charge capacitor 46 with its right hand plate positive and its left hand plate negative. Under this assumed no burst input condition the net charge on these capacitors yields a voltage on line 48 which is zero. If noise is introduced into the system, it will be of equal amplitude but opposite phase across the two diodes and both diodes will be effected to an equal extent resulting in no change in the voltage on line 48. When during a color telecast a burst signal is present we may assume that the burst voltage induced across the two portions of the secondary of transformer 34 are of equal amplitude to the 3.58 megacycle reference signal. With this situation the diode 36 will not conduct since the burst voltage is equal in phase and amplitude to the reference signal and its anode and cathode remain at the same potential. The diode 38 will however, conduct readily since the burst and reference signals have an additive rather than a cancelling effect on it resulting in the diode 38 conducting twice as much as in the previous no burst example and resulting in the capacitor 46 charging to about twice its previous voltage which voltage is presented on line 48 as a control signal.

Suppose now that the burst signal amplitude is reduced to one half that of the foregoing example. With this new assumption the phase relationships remain as before but now diode 36 will conduct about one half its previous amount while diode 38 conducts about 1½ times its previous amount resulting in a voltage on line 48 which is about one half the previous voltage.

The voltage on line 48 which is approximately proportional to the burst voltage is applied to the base of transistor 51 which biases the base of the chroma amplifier transistor 45 thereby controlling the gain of that chroma amplifier stage.

A variation in threshold can be achieved by altering the conduction points of the diodes 36 and 38. This is accomplished by applying a bias voltage to the junction of these two diodes to alter their respective points of conduction thereby changing the output voltage on line 48. For example, if a positive 2 volt direct current bias is applied to the junction of the two diodes, under a no burst input condition, diode 38 will conduct sooner and turn off later than with no bias applied, while diode 36 will turn on later and off sooner than under the no bias condition. This results in a control voltage on line 48 under the no burst condition. In other words, a bias voltage applied to the junction of the two diodes acts as an additional bias on the chroma amplifier stage thereby effecting its gain.

The control of brightness (intensity) and contrast is achieved in the present invention by a second light dependent resistor 53 which is optically coupled to a light emitting diode 55. Light emitting diode 55 and light dependent resistor 53 are encapsulated in a light impervious housing illustrated by the dotted line 57. As the room ambient light changes, the change in the resistance of light dependent resistor 41 causes a change in the current through light emitting diode 55. Variations in the current through the light emitting diode cause corresponding variations in the light emitted thereby which in turn cause variations in the resistance of the light dependent resistor 53. The luminance or video amplifier is here illustrated as a three transistor amplifier with the output of the first amplifier stage being across resistor 59. A diminution in the resistance of light dependent resistor 53 causes a lowering of this output impedance and thus a diminution in the gain of the luminance amplifier. In other words, if the light intensity in the room increases, the resistance of resistor 41 will decrease causing a decrease in the current through light emitting diode 55 and therefore a decrease in its light output level and this decreased light will cause an increase in the resistance of light dependent resistor 53 thus increasing the effective output load resistor for the transistor 61 thus increasing the gain of the video amplifier as desired.

Variable resistor 63 being effectively in series with the light dependent resistor 41 may be varied to compensate for differences in specific light dependent resistors so as to establish a desired level of picture brightness, contrast and color saturation for a given level of ambient light. Variable resistance 65 which is in parallel with the light dependent resistor 41 may be varied so as to effectively change the range of variation in brightness, contrast and color saturation for a specific range of variations in the ambient light conditions. The entire automatic control circuit of the present invention may be bypassed by closing the defeat switch 67.

The effective load resistance for the transistor 61 under direct current conditions is the parallel combination of the resistor 59 and the series pair of resistors 53 and 69 whereas due to the presence of capacitor 71 this effective load resistance under alternating current conditions is the parallel combination of resistors 59 and 53. Thus the ratio of AC to DC gain for this video amplifier stage may be selected by proper selection of these parameters so as to maintain the black level of the picture essentially constant.

Thus while the present invention has been described with respect to a specific embodiment, numerous modifications will suggest themselves to those of ordinary skill in the art. Thus, for example, the present invention has been described in the environment of a televison receiver however, the invention could equally well be used in televison monitors as well as many other types of display devices. Accordingly the scope of the present invention is to be measured only by that of the appended claims.

I claim:

1. In a television receiver, picture tube means for displaying a televised signal, signal receiving means for receiving a transmitted signal and processing said signal to provide a video component, means for sensing ambient light intensity to provide an ambient modifier, means for amplifying said video component, said last means comprising an amplifying member having a load component, means for modifying said video component with said ambient modifier being in parallel with said load component, said last means comprising circuitry to provide predetermined variations in black level display on said picture tube means.

2. The receiver of claim 1 with said last means comprising a parallel circuit having capacitive means in one branch and resistive means in a parallel branch whereby the A.C. signal in the video component is altered in accordance with ambient light to provide said predetermined variations in black level.

3. The receiver in claim 1 with:

said means for amplifying said video component comprising a transistor having an emitter, base and collector, with said collector having a load circuit, said means for modifying said video component comprising a light dependent resistor being in parallel with said load circuit, said circuitry to provide predetermined variations in black level comprising parallel circuitry having capacitive means in one branch and resistive means in another branch.

* * * * *